US008711661B2

(12) United States Patent
Ng et al.

(10) Patent No.: US 8,711,661 B2
(45) Date of Patent: Apr. 29, 2014

(54) BI-DIRECTIONAL PATTERN DEPENDENT NOISE PREDICTION

(71) Applicants: Yibin Ng, Singapore (SG);
Vijayakumar Bhagavatula, Pittsburgh, PA (US); Kui Cai, Singapore (SG)

(72) Inventors: Yibin Ng, Singapore (SG);
Vijayakumar Bhagavatula, Pittsburgh, PA (US); Kui Cai, Singapore (SG)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 13/745,297

(22) Filed: Jan. 18, 2013

(65) Prior Publication Data

US 2013/0188463 A1     Jul. 25, 2013

Related U.S. Application Data

(60) Provisional application No. 61/632,234, filed on Jan. 20, 2012.

(51) Int. Cl.
*G11B 11/00* (2006.01)
(52) U.S. Cl.
USPC ......................... 369/13.02; 360/53
(58) Field of Classification Search
CPC ................ G11B 20/10287; G11B 20/10398
See application file for complete search history.

(56) References Cited

U.S. PATENT DOCUMENTS

| 6,201,839 | B1 | 3/2001 | Kavcic et al. |
| 6,438,180 | B1 | 8/2002 | Kavcic et al. |
| 2010/0067621 | A1* | 3/2010 | Noeldner et al. ............. 375/341 |
| 2010/0067628 | A1* | 3/2010 | Buehner et al. .............. 375/346 |

OTHER PUBLICATIONS

A. Kavcic, and J. Moura, "The Viterbi Algorithm and Markov noise memory," IEEE Trans. on Information Theory, vol. 46, No. 1, pp. 291-301, Jan. 2000.
J. Moon, and J. Park, "Pattern-dependent noise prediction in signal-dependent noise," IEEE Journal on Selected Areas in Communications, vol. 19, No. 4, pp. 730-743, Apr. 2001.

* cited by examiner

*Primary Examiner* — Brenda Bernardi
(74) *Attorney, Agent, or Firm* — Fish & Richardson P.C.

(57) ABSTRACT

A method performed by a disk drive, comprising: receiving a plurality of signal samples over a channel in the disk drive; executing a forward pattern-dependent noise prediction (PDNP) operation on the plurality of the signal samples; generating, based on execution of the forward PDNP operation, a first detection of recorded data bits in the plurality of received signal samples; executing a backward PDNP operation on the plurality of the received signal samples; generating, based on execution of the backward PDNP operation, a second detection of recorded data bits in the plurality of received signal samples; comparing the first detection to the second detection; identifying, based on comparing, one or more erasures in the received plurality of signal samples; and generating one or more sequences of bits that promote correction of the one or more erasures.

20 Claims, 7 Drawing Sheets

BI-DIRECTIONAL PATTERN DEPENDENT NOISE PREDICTION

CLAIM OF PRIORITY

This application claims the benefit of priority under 35 U.S.C. §119(e) to provisional U.S. Patent Application No. 61/632,234, filed on Jan. 20, 2012, the entire contents of which are hereby incorporated by reference.

BACKGROUND

Storage devices (e.g., hard disk drives) store information which can be read over a channel. The channel can retrieve a signal including stored information from a magnetic storage medium or an optical storage medium.

SUMMARY

In one aspect of the present disclosure, a method performed by a disk drive, comprises: receiving a plurality of signal samples over a channel in the disk drive; executing a forward pattern-dependent noise prediction (PDNP) operation on the plurality of the signal samples, with the forward PDNP operation comprising a PDNP operation with forward linear prediction; generating, based on execution of the forward PDNP operation, a first detection of recorded data bits in the plurality of received signal samples; executing a backward PDNP operation on the plurality of the received signal samples, with the backward PDNP operation comprising a PDNP operation with backward linear prediction; generating, based on execution of the backward PDNP operation, a second detection of recorded data bits in the plurality of received signal samples; comparing the first detection to the second detection; identifying, based on comparing, one or more erasures in the received plurality of signal samples; and generating one or more sequences of bits that promote correction of the one or more erasures.

Implementations of the disclosure can include one or more of the following features. In some implementations, generating, based on execution of the forward PDNP operation, the first detection comprises: detecting, based on execution of the forward PDNP operation, a first sequence of bits that are obtained using forward linear prediction on noise samples in the plurality of signal samples received from the channel in the disk drive; wherein generating, based on execution of the backward PDNP operation, the second detection comprises: detecting, based on execution of the backward PDNP operation, a second sequence of bits that are obtained using backward linear prediction on the noise samples in the plurality of signal samples received from the channel in the disk drive; wherein comparing the first detection to the second detection comprises: comparing the first sequence of detected bits to the second sequence of detected bits; wherein identifying, based on comparing the first detection to the second detection, the one or more erasures in the received plurality of signal samples comprises: identifying, based on comparing the first sequence of detected bits to the second sequence of detected bits, a mismatch between at least a bit in the first sequence and a bit in the second sequence, with the mismatch being indicative of an error pattern in the received plurality of signal samples; and wherein generating the one or more sequences of bits that promote correction of the one or more erasures comprises: generating one or more sequences of bits that promote correction of the error pattern.

In still other embodiments, generating the one or more sequences of bits that promote correction of the one or more erasures comprises: generating, using a Mahalanobis distance metric, a maximum likelihood sequence for correction of the one or more erasures. In other embodiments, at least a portion of the plurality of signal samples comprises jitter noise. In still other embodiments, the channel comprises a heat-assisted magnetic recording channel. In yet other embodiments, generating, based on execution of the forward linear prediction operation, the first detection comprises: generating, based on execution of the forward PDNP operation with previous noise samples from the received signal samples, the first detection.

In some embodiments, generating, based on execution of the backward linear prediction operation, the second detection comprises: generating, based on execution of the backward PDNP operation with future noise samples from the received signal samples, the second detection. In still other embodiments, the forward PDNP operation comprises a series of instructions that are based on:

$$\hat{n}_k(a_{k-M}^{k+\Delta}) = \sum_{i=1}^{L} f_i(a_{k-M}^{k+\Delta}) n_{k-i}(a_{k-i-I}^{k-i})$$

$$= \sum_{i=1}^{L} f_i(a_{k-M}^{k+\Delta})[y_{k-i} - s_{k-i}(a_{k-i-I}^{k-i})];$$

wherein $\hat{n}_k$ is the first prediction of noise samples; wherein $y_k = s_k(a_{k-I}^{k}) + n_k(a_{k-M}^{k+\Delta})$; wherein $s_k$ is a desired signal; wherein $n_k$ is a noise component; wherein $a_k$ is a transmitted data bit; wherein $a_{k-M}^{k+\Delta}$ is a data-dependence of $n_k$ for some non-negative integers $\Delta$ and M; wherein $f_i$ is one or more forward noise predictor coefficients; wherein L is a length of the first prediction; and wherein I+1 is the length of the target used in the forward PDNP operation.

In still other embodiments, the backward PDNP operation comprises a series of instructions that are based on:

$$\hat{n}_{b,k}(a_{k-\Delta}^{k+M}) = \sum_{i=1}^{L} b_i(a_{k-\Delta}^{k+M}) n_{b,k+i}(a_{k+i}^{k+i+I})$$

$$= \sum_{i=1}^{L} b_i(a_{k-\Delta}^{k+M})[y_{b,k+i} - s_{b,k+i}(a_{k+i}^{k+i+I})];$$

wherein $\hat{n}_{b,k}$ is the second prediction of noise samples; wherein $b_i$ is a backward noise predictor coefficient; wherein $y_{b,k} = s_{b,k}(a_k^{k+I'}) + n_{b,k}(a_{k-\Delta}^{k+M'})$; wherein $s_k$ is a desired signal; wherein $n_k$ is a noise component; wherein $a_k$ is a transmitted data bit; wherein $a_{k-M}^{k+\Delta}$ is a data-dependence of $n_k$ for some non-negative integers $\Delta$ and M; wherein L is a length of the second prediction; and wherein I+1 is the length of the target used in the backward PDNP operation.

In some implementations, the method further includes correcting the one or more erasures in the received plurality of signal samples. In still other implementations, correcting comprises: inserting the generated one or more sequences into one or more locations of the one or more erasures in the received plurality of signal samples.

In still another aspect of the disclosure, one or more machine-readable media are configured to store instructions that are executable by one or more processors to perform operations including receiving a plurality of signal samples over a channel in a disk drive; executing a forward pattern-dependent noise prediction (PDNP) operation on the plurality of the signal samples, with the forward PDNP operation comprising a PDNP operation with forward linear prediction; generating, based on execution of the forward PDNP operation, a first detection of recorded data bits in the plurality of received signal samples; executing a backward PDNP operation on the plurality of the received signal samples, with the backward PDNP operation comprising a PDNP operation with backward linear prediction; generating, based on execution of the backward PDNP operation, a second detection of recorded data bits in the plurality of received signal samples; comparing the first detection to the second detection; identifying, based on comparing, one or more erasures in the received plurality of signal samples; and generating one or more sequences of bits that promote correction of the one or more erasures. Implementations of this aspect of the present disclosure can include one or more of the foregoing features.

In still another aspect of the disclosure, an electronic system includes one or more processors; and one or more machine-readable media configured to store instructions that are executable by the one or more processors to perform operations including: receiving a plurality of signal samples over a channel in a disk drive; executing a forward pattern-dependent noise prediction (PDNP) operation on the plurality of the signal samples, with the forward PDNP operation comprising a PDNP operation with forward linear prediction; generating, based on execution of the forward PDNP operation, a first detection of recorded data bits in the plurality of received signal samples; executing a backward PDNP operation on the plurality of the received signal samples, with the backward PDNP operation comprising a PDNP operation with backward linear prediction; generating, based on execution of the backward PDNP operation, a second detection of recorded data bits in the plurality of received signal samples; comparing the first detection to the second detection; identifying, based on comparing, one or more erasures in the received plurality of signal samples; and generating one or more sequences of bits that promote correction of the one or more erasures. Implementations of this aspect of the present disclosure can include one or more of the foregoing features.

All or part of the foregoing can be implemented as a computer program product including instructions that are stored on one or more non-transitory machine-readable storage media, and that are executable on one or more processors. All or part of the foregoing can be implemented as an apparatus, method, or electronic system that can include one or more processors and memory to store executable instructions to implement the stated operations.

The details of one or more implementations are set forth in the accompanying drawings and the description below. Other features, objects, and advantages will be apparent from the description and drawings, and from the claims.

BRIEF DESCRIPTION OF THE FIGURES

Like reference numbers and designations in the various drawings indicate like elements.

DETAILED DESCRIPTION

A system consistent with this disclosure employs magnetic recording technologies to record and to read data stored in storage devices. Different types of channels can be used to record and to read the data. For example, a heat-assisted magnetic recording (HAMR) channel uses heat to magnetically record and to read data. As another example, a perpendicular magnetic recording (PMR) channel is used to magnetically record and to read data, e.g., when magnetization of a storage medium is oriented normal to a surface of the storage medium. Once data has been read over a channel, the system can implement a bi-directional pattern-dependent noise prediction (bi-PDNP) operation to predict noise introduced to the read data. Generally, a pattern-dependent noise prediction (PDNP) operation is a linear prediction scheme based on a maximum-likelihood sequence (MLS) operation or on a near maximum-likelihood sequence (near MLS) operation. Generally, a MLS operation is a method of estimating selected parameters of a statistical model based on maximizing the likelihood of the selected parameters.

Generally, a bi-PDNP operation is a linear prediction scheme including a forward PDNP operation and a backward PDNP operation. Generally, a forward PDNP operation is an operation that performs detection on the recorded data bits which involves predicting a current noise sample based on past noise samples. Generally, a backward PDNP operation is an operation that performs detection on the recorded data bits which involves predicting a current noise sample based on future noise samples. Generally, noise samples are a portion of a signal that is modified by noise.

Using predicted noise, the system can at least partially compensate for the introduced noise to improve the bit error rate (BER) of the processed data. The BER is the number of bit errors divided by the total number of processed bits. There are various types of noise, including, e.g., jitter noise. Jitter noise is a type of noise originating from random shifts of transition boundaries of the recorded bits in a storage device.

Figure 1:
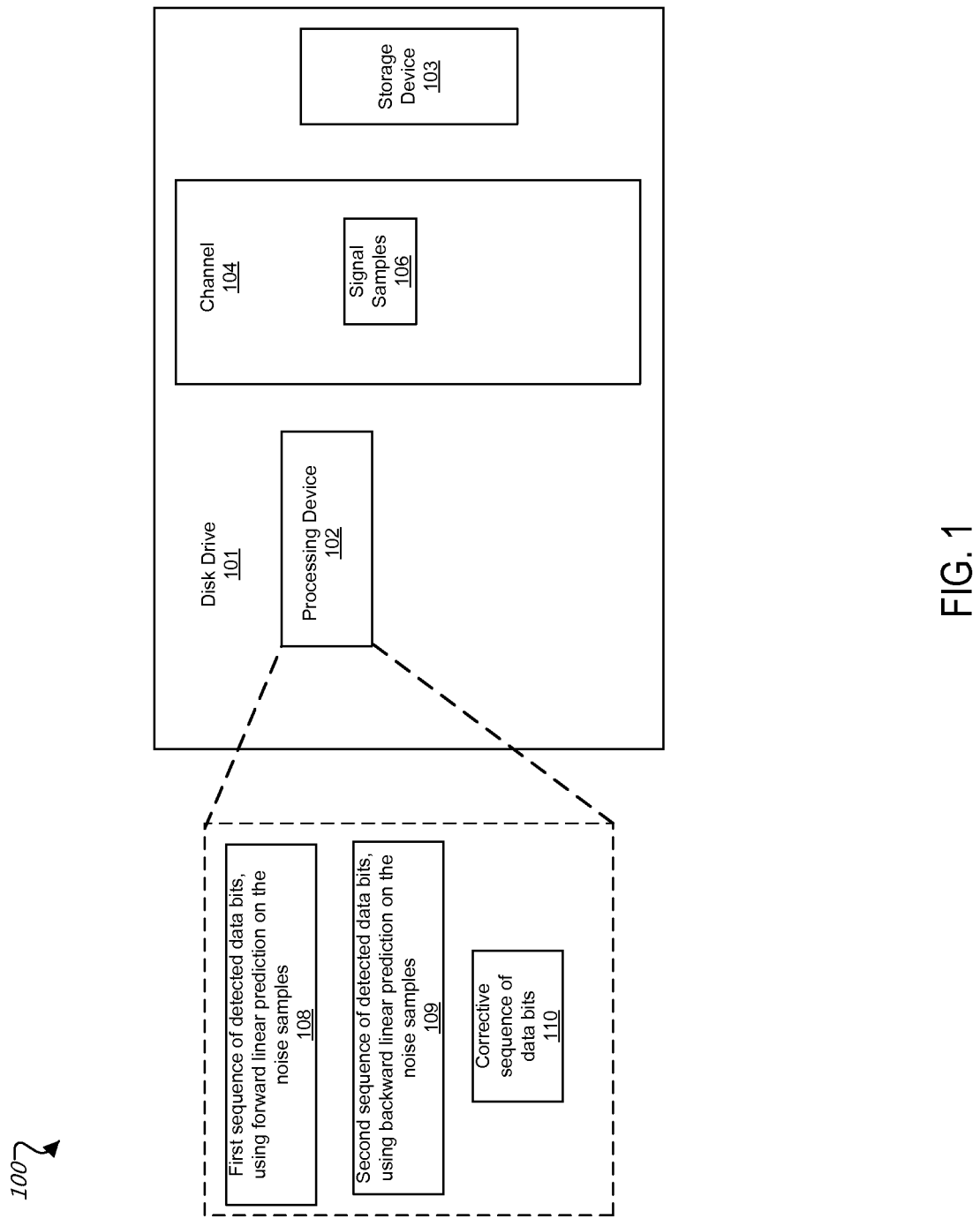
FIG. 1 shows an example of an environment for bi-directional pattern dependent noise prediction.

FIG. 1 shows an example of an environment 100 including a disk drive 101. In some implementations, the disk drive 101 can include a processing device 102, a storage device 103, and a channel 104. The storage device 103 can be a magnetic medium. The processing device 102 can receive and process signal samples 106 read from the storage device 103. Signal samples 106 can be analog signals including digital information (e.g., before digitization) or digital signals (e.g., after digitization). The channel 104 can include a magnetic recording channel (e.g., HAMR or PMR channel) capable of scanning a surface of the storage device 103 to measure signal samples 106 in the form of an analog signal including digital information.

The processing device 102 can receive signal samples 106 from the channel 104. Using a forward PDNP operation on the signal samples 106, the processing device 102 can generate a first sequence of detected data bits 108. For example, the processing device 102 generates the first sequence of detected data bits 108 by using the forward PDNP operation to detect a sequence of data bits in signal samples 106. Using a backward PDNP operation on signal samples 106, the processing device 102 can also generate a second sequence of detected data bits 109. By comparing the first sequence of detected data bits 108 to the second sequence of detected data bits 109, the processing device 102 can identify erasures in the sequences of detected data bits. Generally, an erasure indicates that the data bit may not be detected correctly. In some implementations, the processing device 102 can find erasures based on a mismatch between data bits included in the first sequence of detected data bits 108 and data bits included in the second sequence of detected data bits 109. The processing device 102 can further process signal samples 106 and the identified erasures to provide a corrective sequence of data bits 110 using a distance metric analysis (e.g., Mahalanobis distance metric analysis). Generally, a Mahalanobis distance metric is a distance measure that takes into account the correlation between the received signal samples and outputs the most probable sequence. In some implementations, the identified erasures are further processed by the processing device 102. The processing device 102 can correct identified erasures and/or a subset of identified erasures. The processing device 102 can insert the corrected erasures into either the first sequence of detected data bits 108 or the second sequence of detected data bits 109 to reduce number of erasures in the detected data bits, e.g., relative to a number of erasures in the detected data bits without correction. In some implementations, the disk drive 101 implements the bi-PDNP operation to provide improved accuracy of processing signal samples 106 with a reduced BER, relative to a BER without implementation of the bi-PDNP operation.

In some implementations, the first sequence of detected data bits is based on a forward PDNP operation and the second sequence of detected data bits is based on a backward PDNP operation. In this case, the processing device 102 implements a bi-PDNP operation. The processing device 102 can use the bi-PDNP operation to improve prediction performance, e.g., relative to performance independent of implementation of the bi-PDNP operation. For example, the bi-PDNP operation can generate a reading of signal samples 106 with increased accuracy, e.g., compared to an accuracy of a reading generating by only a forward PDNP operation. The performance of the bi-PDNP operation can be less susceptible to jitter noise than the forward PDNP operation. In a variation of FIG. 1, the processing device 102 may be external to the disk drive 101 and configured for communication with the disk drive.

Figure 2:
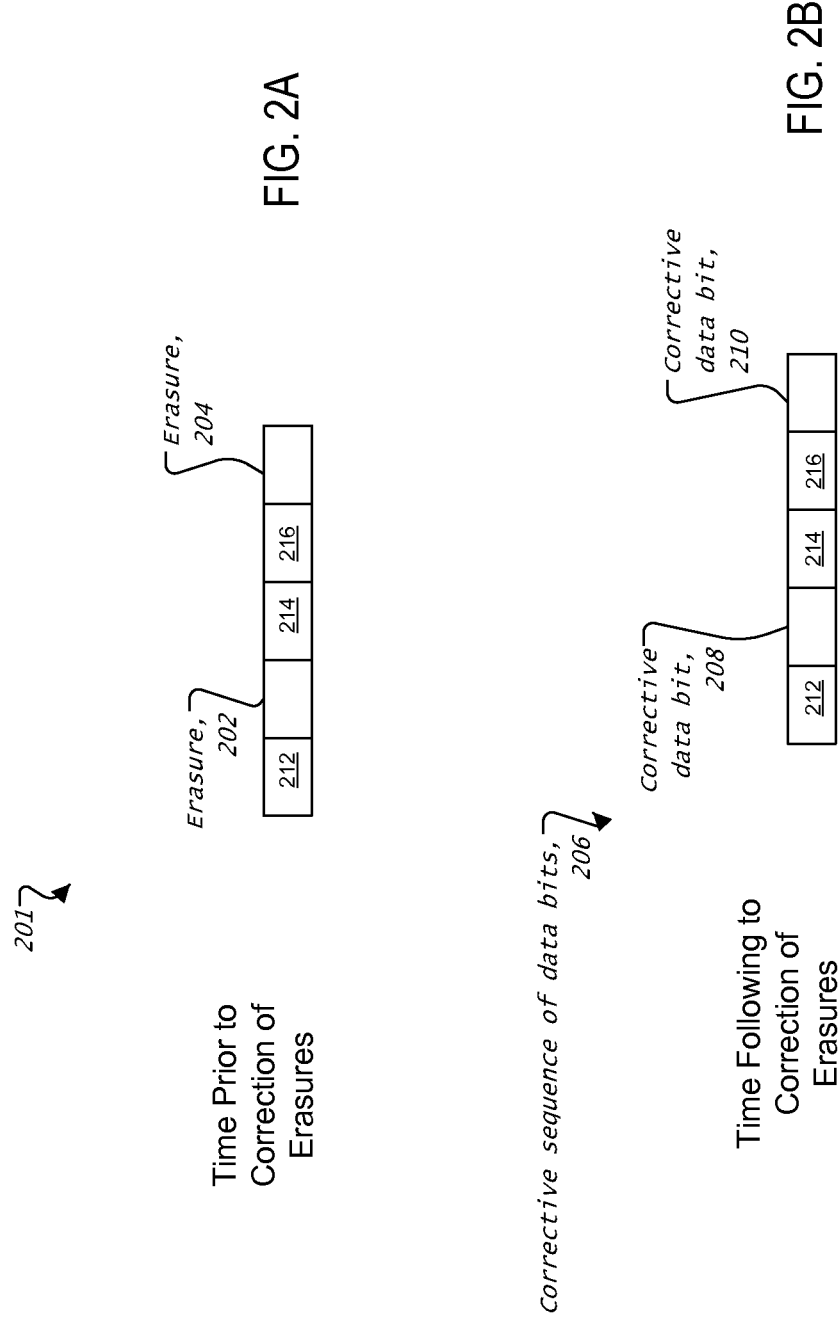
FIGS. 2A and 2B show images representative of data bits.

FIG. 2A illustrates sequence 201 at a time that is prior to correction of erasures. Processing device 102 (FIG. 1) generates sequence 201 based on a comparison of the first sequence of detected data bits 108 to the second sequence of detected data bits 109. Data bits 212, 214 and 216 are identical for both the first sequence of detected data bits 108 and second sequence of detected data bits 109. In this example, data bits 202 and 204 are different for the first sequence of detected data bits 108 and the second sequence of detected data bits 109. The processing device 102 can identify data bits 202 and 204 as erasures (hereinafter erasures 202, 204). The length of erasures can be of various lengths. For example, erasure 202 can be one data bit and erasure 204 can be multiple data bits (e.g., 10, 50 or 100 bits). For example, when erasure 202 is one data bit, a first sequence of detected data bits 108 and a second sequence of detected data bits 109 of the erasure 202 can have values +1 and −1, respectively. In another example, a first sequence of detected data bits 108 and a second sequence of detected data bits 109 of the erasure 202 can have values −1 and +1, respectively. In this example, there is a mismatch among the bit values in a position of erasure 202 for the first sequence of detected data bits 108 and the second sequence of detected data bits 109. The correct data bit 214 can be one bit or multiple data bits (e.g., 10, 50 or 100 bits).

FIG. 2B illustrates an example showing a corrective sequence of data bits 206. In this example, processing device 102 generates corrective sequence of data bits 206 by inserting corrective data bits 208 and 210 into the location of erasures 202 and 204, respectively. Corrective data bits 208 and 210 can be obtained by processing each of the erasures 202 and 204 using a detection process. Referring back to FIG. 2A, in some implementations, the detection process is applied to sequence 201 along with the information indicative of a position of the erasures 202 and 204.

Figure 3:
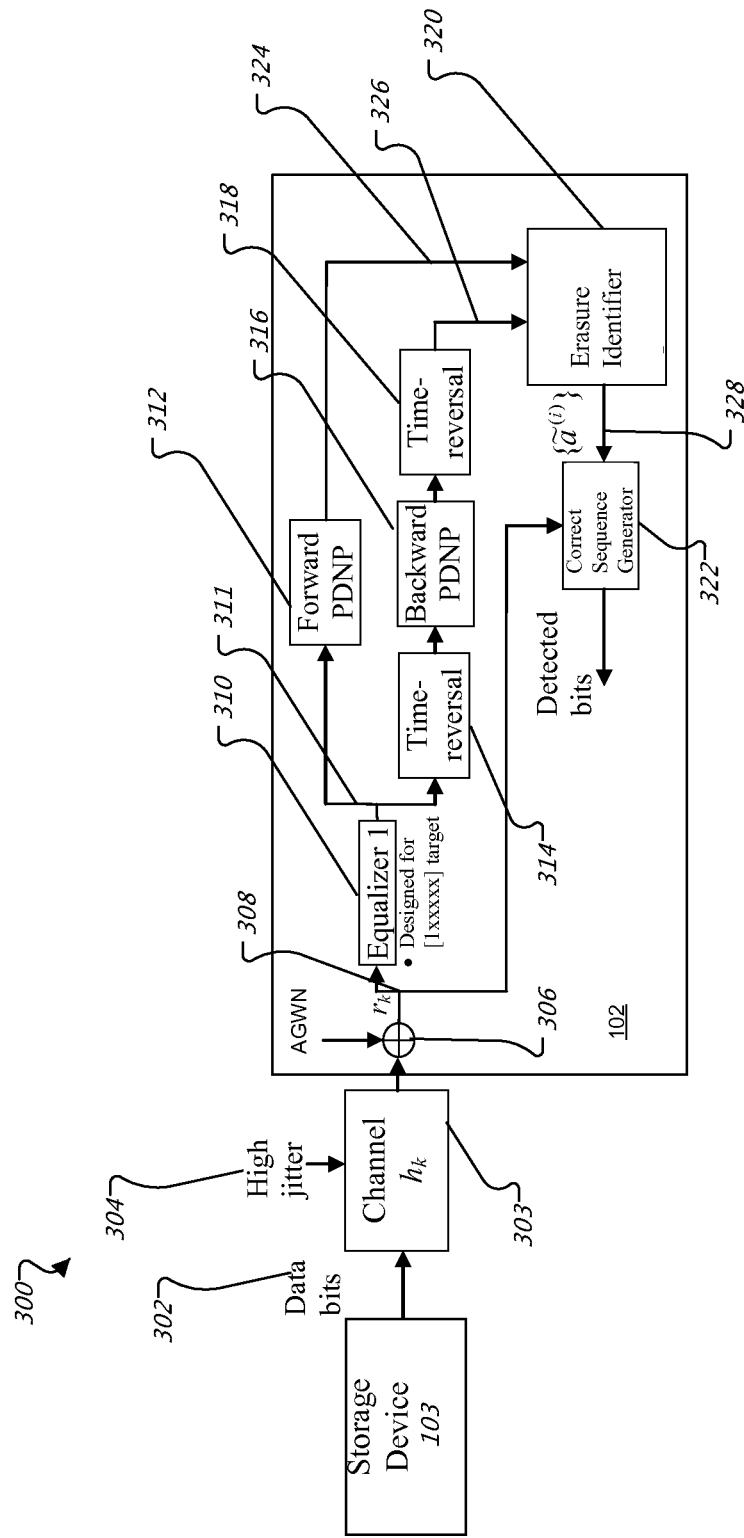
FIGS. 3-5 and 7 show components of a disk drive for performing bi-directional pattern dependent noise prediction.

FIG. 3 shows an example of the read channel of a disk drive 300 for performing a bi-PDNP operation. The read head of the disk drive reads the data that is stored in the storage device 103, and obtains the read signal 308. During this process, the data bits are corrupted by a recording channel 303 that introduces inter-symbol interference (ISI) to the data bits. Further, the read signal 308 is corrupted by jitter noise which arises due to random shifts in the location of the transition boundaries between bits. The process of the reading the data by the read head also introduces electronics noise, which is commonly modeled as additive white Gaussian noise (AWGN) 306. Various components within the processing device 102 further process the resulting read signal 308.

The recording channel 303 can read data bits 302 based on a recording channel model (e.g., thermal Williams-Comstock (TWC) model) to predict transition lengths for the data stored in the storage device 103. Two main parameters—transition center $x_0$, and transition width $a$—can be obtained from the channel model. The microtrack model can be used to capture effects of the thermal profile in a cross-track direction of the storage device 103. Generally, a microtrack model divides the data track of a magnetic medium into two or more smaller data tracks. When using a microtrack model, Karlqvist head approximations can be used to retrieve a transition response $V(x, a, x_0)$ of each microtrack from an arctangent magnetization transition according to equation 1 (Eq. (1)), shown below:

$$V(x, a, x_0) = -CM_r t \ln\left(\frac{(g_r/2 - (x - x_0))^2 + (d + a + t/2)^2}{(g_r/2 + (x - x_0))^2 + (d + a + t/2)^2}\right) \quad (1)$$

where C is a system specific constant, $M_r$ is remnant magnetization, t is medium thickness, $g_r$ is read head gap, and d is distance from bottom of the reader shield to the top of the magnetic layer of the magnetic medium located in storage device 103.

As shown in FIG. 3, the data processing device 102 can include an equalizer component 310 which receives the read signal 308. The equalizer component 310 can equalize the received read signal 308 to provide an output signal 311. Effectively, in the absence of mis-equalization, jitter noise, and AWGN, the convolution of the recording channel with the equalizer equals the target. This also means that in the absence of mis-equalization, jitter noise, and AWGN, the convolution of data bits 302 with the target equals output signal 311. The target length $N_p$ can be one or multiple bits.

In some implementations, the target can be designed to be a pre-determined set of coefficients. For example, the target length $N_p$ can be set to 6 and the pre-determined set of target coefficient can be denoted by [1 x x x x x]. In this example, the coefficient for the first bit is 1, which is referred to as the monic constraint. The coefficients for the second to sixth bit are denoted as x, which may represent any real value as determined by the equalizer design process. The coefficients for the second to the sixth bit do not need to be identical to each other.

The output signal 311 provided by the equalizer component 310 is further processed by a forward PDNP component 312. The forward PDNP component 312 is commonly applied together with a detection algorithm (e.g., Viterbi algorithm) to identify recorded data bits $a_1, \ldots, a_k, \ldots, a_N$ in the given order. Generally, Viterbi algorithm is a dynamic algorithm for finding the most likely sequence of transmitted data bits over a communications channel. In some implementations, the forward PDNP component 312 can implement operation by expressing the equalizer output signal 311 according to Eq. (2), shown below:

$$y_k = s_k(a_{k-I}^k) + n_k(a_{k-M}^{k+\Delta}) \quad (2)$$

where $s_k$, $n_k$ and $a_k$ are the desired signal, noise component, and recorded data bit respectively. Eq. (2) shows the data-dependence of $s_k$, where $a_{k-I}^k$ is a shorthand notation for the sequence $\{a_{k-I}, \ldots, a_k\}$ and $I+1=N_p$ is the target length. The signal $s_k$ can be expressed as Eq. (3), shown below:

$$s_k(a_{k-I}^k) = \sum_{i=0}^{N_p-1} p_i a_{k-i} \quad (3)$$

where $[p_0\, p_1 \ldots p_{Np-1}]$ are the target coefficients. Eq. (2) also shows that the data-dependence of $n_k$ is function of $a_k^{k-M k+\Delta}$ where $\Delta$ and M are non-negative integers.

A predicted noise sample $\hat{n}_k$ can be computed according to Eq. (4), shown below:

$$\hat{n}_k(a_{k-M}^{k+\Delta}) = \sum_{i=1}^{L} f_i(a_{k-M}^{k+\Delta}) n_{k-i}(a_{k-i-I}^{k-i})$$

$$= \sum_{i=1}^{L} f_i(a_{k-M}^{k+\Delta})[y_{k-i} - s_{k-i}(a_{k-i-I}^{k-i})] \quad (4)$$

where $f_i$ are noise predictor coefficients and L is the length of the predictor. In addition, a predictor error variance $\sigma_p^2$ can be computed according to Eq. (5), shown below:

$$\sigma_p^2(a_{k-M}^{k+\Delta}) = E\{(n_k - \hat{n}_k)^2 | a_{k-M}^{k+\Delta}\}. \quad (5)$$

Using $\hat{n}_k$ and $\sigma_p^2$, a branch metric in the trellis of the Viterbi algorithm can be expressed as Eq. (6), shown below:

$$\ln \sigma_p(a_{k-M}^{k+\Delta}) + \frac{[y_k - \hat{n}_k(a_{k-M}^{k+\Delta}) - s_k(a_{k-I}^k)]^2}{2\sigma_p^2(a_{k-M}^{k+\Delta})}. \quad (6)$$

In some implementations, the trellis state can be expressed as $a_{k-\max(M,\, I+L)}^{k+\Delta-1}$, as can be shown from Eqs. (4) and (6). For example, the number of states in the trellis is given by $2^{\Delta+M}$ when $M \geq I+L$ is assumed. In some implementations, the trellis state is given by $[a_{k-M} \ldots a_{k+\Delta-1}]$. As shown in FIG. 3, the detected data bits 324 is received by a erasure identifier component 320.

A time-reversal component 314 can further process the output signal 311 to time-reverse (or flip) the output signal 311. The processing device 102 sends the time-reversed output signal 311 to a backward PDNP component 316. In some implementations, the backward PDNP component 316 can implement an operation by expressing an output signal 311 according to Eq. (7), shown below:

$$y_{b,k} = s_{b,k}(a_k^{k+I'}) + n_{b,k}(a_{k-\Delta'}^{k+M'}) \quad (7)$$

where $s_{b,k}$ and $n_{b,k}$ are the desired signal and noise component, respectively, for the backward PDNP operation. $I'+1=N_p$ is the target length. M' and $\Delta'$ are non-negative integers. Generally, $I \neq I'$, $M \neq M'$ and $\Delta \neq \Delta'$. In some implementations, $I=I'$, $M=M'$, $\Delta=\Delta'$, and the signal $s_{b,k}$ can be expressed as Eq. (8), shown below:

$$s_{b,k}(a_k^{k+I}) = \sum_{i=0}^{N_p-1} g_i a_{k+N_p-1-i} \quad (8)$$

where $[g_0\, g_1 \ldots g_{Np-1}]$ are target coefficients for the backward PDNP operation. When $p_k = g_k$ for $k=0$ to $N_p-1$, then $s_{b,k} = s_{k+Np-1}$. If $n_{b,k}$ and $n_{k+Np-1}$ have the same data-dependent window, $n_{b,k} = n_{k+Np-1}$.

A predicted noise sample $\hat{n}_{b,k}$ can be computed according to Eq. (10), shown below:

$$\hat{n}_{b,k}(a_{k-\Delta}^{k+M}) = \sum_{i=1}^{L} b_i(a_{k-\Delta}^{k+M}) n_{b,k+i}(a_{k+i}^{k+i+I})$$

$$= \sum_{i=1}^{L} b_i(a_{k-\Delta}^{k+M})[y_{b,k+i} - s_{b,k+i}(a_{k+i}^{k+i+I})] \quad (10)$$

where $b_i$ denotes the backward noise predictor, when backward PDNP operation has the same $N_p$, and L parameters as the forward PDNP operation. Generally, $N_p$, and L parameters for the backward PDNP operation can be different from $N_p$, and L parameters used for the forward PDNP operation.

A branch metric in the trellis for the backward PDNP can be express as Eq. (9), shown below:

$$\ln \sigma_b(a_{k-\Delta}^{k+M}) + \frac{[y_{b,k} - \hat{n}_{b,k}(a_{k-\Delta}^{k+M}) - s_{b,k}(a_k^{k+I})]^2}{2\sigma_b^2(a_{k-\Delta}^{k+M})} \quad (9)$$

In some implementations, the trellis state for backward PDNP can be given by $[a_{k+M} \ldots a_{k-\Delta+1}]$. A detection algorithm (e.g., Viterbi algorithm) can be used to detect $a_N, \ldots, a_k, \ldots, a_1$, in the given order. As shown in FIG. 3, the identified trellis state is received by a second time-reversal component 318 to be time reversed (or flipped). The time-reversed data bits 336 are received by the erasure identifier component 320.

As shown in FIG. 3, the first time-reversal component 314 applies a time-reversal to the output signal 311 being sent to the backward PDNP component 316. This enables the backward PDNP operation to use future noise samples to predict current noise sample. For example, when the prediction order is 2, during the forward PDNP operation, noise samples at time instants k−1 and k−2 can be used to predict the noise sample at time instant k. In another example, when the prediction order is 2, during the backward PDNP operation, noise samples at time instants k+1 and k+2 can be used to predict the noise sample at time instant k. The output of the backward PDNP component 316 is time-reversed by the second time-reversal component 318. The data bits 324 and 326 are received by an erasure identifier component 320. In the example illustrated in FIG. 3, one equalizer and one predetermined set of target coefficients is used and $p_k = g_k$ for $k=0$ to $N_p-1$.

FIG. 3 shows that the erasure identifier 320 receives the detected bits 324 and 326 from the forward PDNP component 312 and the second time-reversal component 318, respectively. The erasure identifier component 320 compares the two sequences of detected bits 324 and 326. For example, the detected bits 324 can be expressed as $\hat{a}^f = [\hat{a}_0^f\, \hat{a}_1^f \ldots \hat{a}_{N-1}^f]$ with length N, and the detected bits 326 can be expressed as $\hat{a}^b = [\hat{a}_0^b\, \hat{a}_1^b \ldots \hat{a}_{N-1}^b]$ with length N. By comparing the two sets of detected bits 324 and 326, the erasure identifier 320 can generate a sequence $\epsilon = \hat{a}^f - \hat{a}^b = [\epsilon_0 \, \epsilon_1 \ldots \epsilon_{N-1}]$, where $\epsilon_k \in \{+2, 0, -2\}$. The elements $\bar{\epsilon}$ of that take values +2 or -2 are identified as erasures (e.g., erasures 202 and 204 as shown in FIG. 2A). From the sequence $\epsilon$ of length N, error patterns of length $N_\epsilon (N_\epsilon \leq N)$ can be extracted. Denote the error pattern that starts at time instant $l$ and ends at time instant $l+N_\epsilon-1$ as $\epsilon_{\bar{l}} = [\epsilon_l \, \epsilon_{l+1} \ldots \epsilon_{l+N\epsilon-1}]$. The erasure identifier 320 can identify error patterns from the sequence $\epsilon$ based on the following conditions:

(1) $\epsilon_l \neq 0$ and $\epsilon_{l+N\epsilon-1} \neq 0$;
(2) $\epsilon_{l+i} = 0$ for $-N_h+1 \leq i \leq -1$ and $N_\epsilon \leq i \leq N_\epsilon + N_h - 2$; and
(3) length of strings of zero bits, if any, in $\epsilon_l$ must be $\leq N_h - 2$.

In the above conditions, $N_h$ is recording channel length. Elements of $\epsilon$ that do not satisfy the above conditions can be tallied as data bits that are most likely to be detected correctly, since the same decisions were made by both the forward PDNP 312 and backward PDNP 316 detectors.

A corrective sequence generator 322 can receive the read signal 308 and of the identified error patterns 328 along with the information (e.g., location, bit values) of the identified error patterns. From the received information, the corrector sequence generator 322 generates one or more sequences of data bits that include corrected data bits of the identified error patterns. In some implementations, the corrector sequence generator 322 can form possible data sequences for each of the identified error patterns. For example, for the error pattern 328, $N_b$ bits can be identified as erasure bits at locations $l_1, l_2, \ldots, l_{Nb}$. Possible data sequences $(\tilde{a}^{(i)})$ for $i=1, 2, \ldots, 2^{Nb}$, each having a length of $N_\epsilon + 2N_h - 2$, can be formed according to the following conditions:

(1) $\tilde{a}_k^{(i)} = \hat{a}_k^f$ for $1-N_h+1 \leq k \leq l+N_\epsilon+N_h-2$ and $k \neq l_1, l_2, \ldots, l_{Nb}$; and
(2) $\tilde{a}_k^{(i)} =$ one of the $2^{Nb}$ possible data sequence for $k = l_1, l_2, \ldots, l_{Nb}$.

Based on the formed possible data sequences, the corrected sequence generator 322 can use other detection methods to find the correct sequence of the error pattern 328. For example, the detection method can be a maximum likelihood (ML) estimation model. The ML estimation model can rely on a metric expressed as shown in the below Eq. (11):

$$\arg\max_{\underline{\tilde{a}}^{(i)}} f(\underline{r} | \underline{\tilde{a}}^{(i)}) = \arg\max_{\underline{\tilde{a}}^{(i)}} \frac{1}{(2\pi)^{N/2} |\underline{C}^{(i)}|^{1/2}} \exp\left(-\frac{1}{2}(\underline{r} - \underline{\mu}^{(i)})^T (\underline{C}^{(i)})^{-1} (\underline{r} - \underline{\mu}^{(i)})\right)$$
$$= \arg\min_{\underline{\tilde{a}}^{(i)}} \ln|\underline{C}^{(i)}| + (\underline{r} - \underline{\mu}^{(i)})^T (\underline{C}^{(i)})^{-1} (\underline{r} - \underline{\mu}^{(i)}), \quad (11)$$

where $r$ are the readback samples and $C$ is the covariance matrix of $r$. The metric expressed in Eq. (11) is a squared Mahalanobis distance, with an additional $\ln|C^{(i)}|$ term. This metric can be obtained when the readback samples $r$ have a multivariate normal distribution, and the mean $\mu_k^{(i)} = h_k * \tilde{a}_k^{(i)}$, where * denotes convolution and $h_k$ is the discrete-time bit response. In some implementations, the correct sequence generator 324 can compute C analytically using first order Taylor series on the read signal 308 with jitter noise 304.

In another implementation, other schemes are possible in correcting the identified erasures. For example, the identified erasures can be input to an error correction decoder that can correct both errors and erasures.

Figure 4:
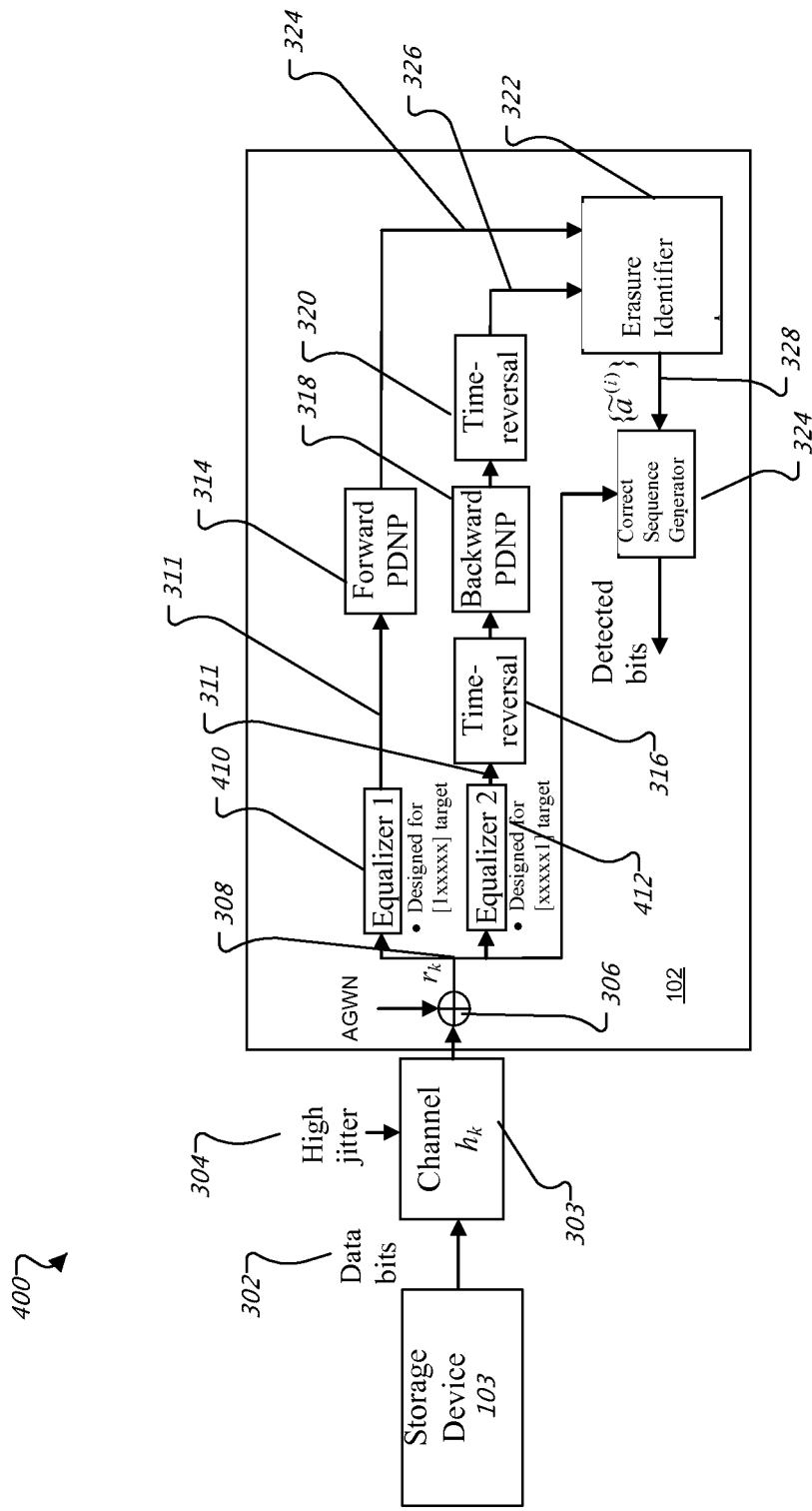

FIG. 4 illustrates an example of a disk drive 400 including a first equalizer component 410 and a second equalizer component 412 to perform the bi-PDNP operation. The first equalizer component 410 can equalize a read signal 308 according to a first predetermined set of target coefficients. The second equalizer component 412 can equalize the read signal 308 according to a second pre-determined set of target coefficients. For example, a first predetermined set of target coefficients can be [1 x x x x x] and a second predetermined set of target coefficients can be [x x x x x 1]. In this example, the coefficient x can take any real value, and the coefficients need not be identical. In another example, the monic constraint of the targets may be removed and the coefficients can take any real value.

In these examples, the second set of predetermined set of target coefficients can be a time-reversed version of the first set of predetermined set of target coefficients. In some other implementations, the second predetermined set of target coefficients can be designed independent from the first predetermined set of target coefficients. The equalized output signal 311 can be further processed following similar procedures as described in relation to FIG. 3. Using two different predetermined set of target coefficients for the forward and backward PDNP components 314 and 318, respectively, can improve the corrected data bit rates, and reduce the BER. For example, using two different predetermined set of target coefficients can introduce a larger diversity in the noise than using only one predetermined set of target coefficients, and the accuracy of identifying erasures can be increased.

Figure 5:
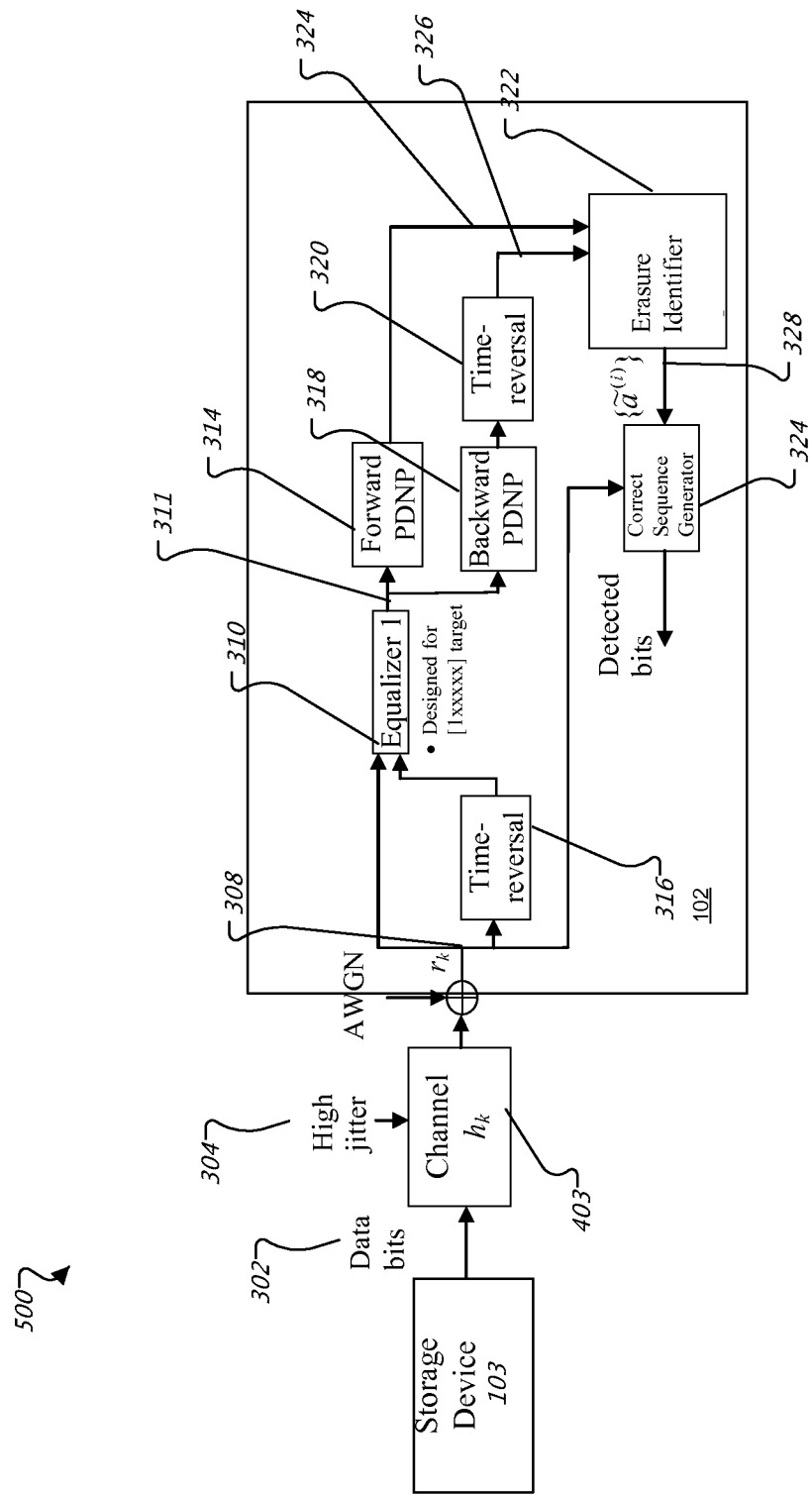

FIG. 5 illustrates an example of a disk drive 500 including an equalizer component 310. For a forward PDNP operation, the equalizer component 310 equalizes a read signal 308 directly from a channel 303 and sends an output signal 311 to a forward PDNP component 314. For a backward PDNP operation, the read signal 308 is processed by a first time-reversal component 314 and then sent to the equalizer component 310, which provides a time-reversed equalized output signal 311. The time-reversed equalized output signal 311 is received by a backward PDNP component 318. In this configuration, effectively different target coefficients can be used to equalize the output signals 311 for the forward and backward PDNP components 314 and 318 while using one equalizer component 310. This can allow the disk drive 102 to have reduced number of components, small installation space and low power requirements than the example illustrated in FIG. 4. Examples illustrated in FIGS. 4 and 5 can be effectively equivalent when the channel 303 is symmetric, for example, as in magnetic recording channels.

Figure 6:
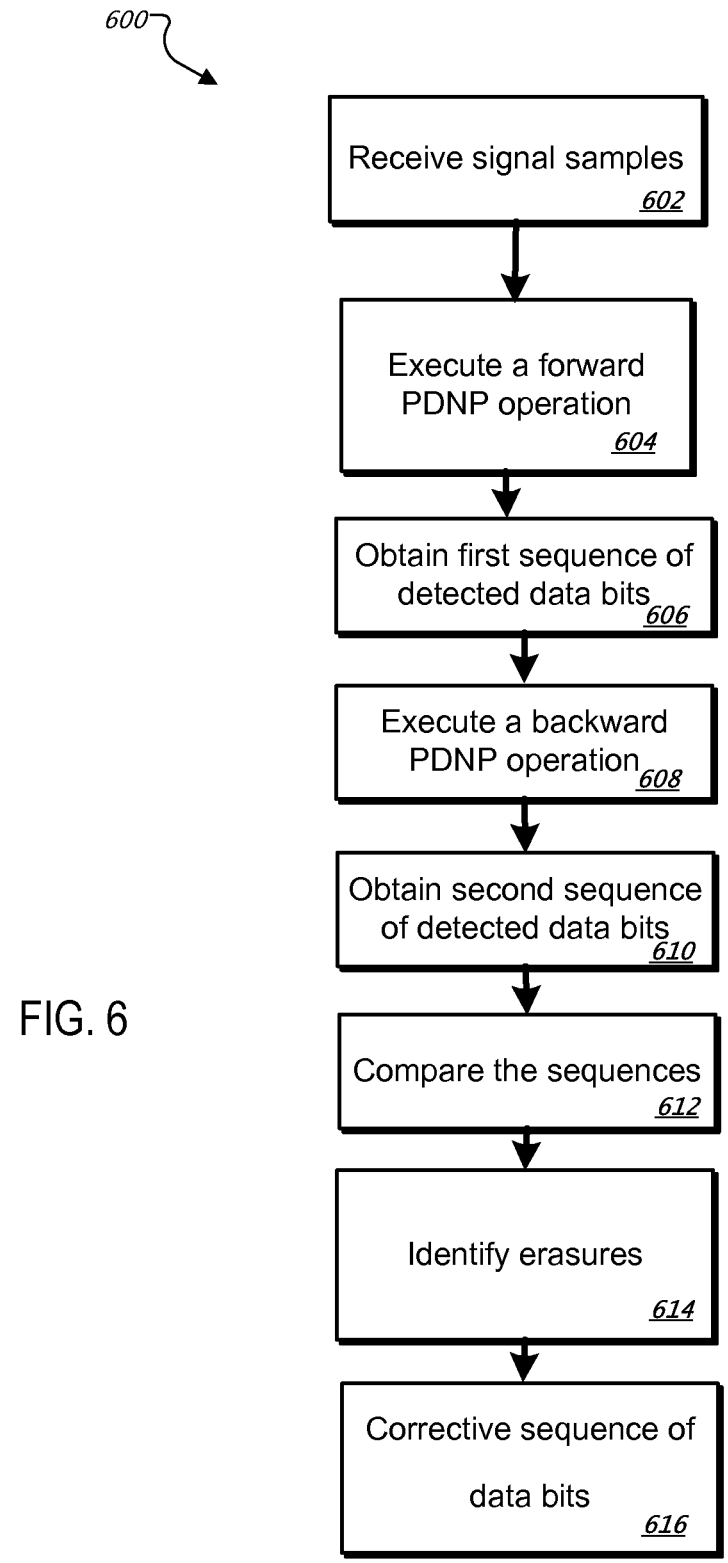
FIG. 6 is a flowchart of a process for performing bi-directional pattern dependent noise prediction.

FIG. 6 shows an example of a process 600 used to perform a bi-PDNP operation. In some implementations, the process 600 can be used in conjunction with an environment 100 described in FIG. 1.

In operation, a processing device 102 (FIG. 1) receives (602) signal samples 106, e.g., from a storage device 103 through a channel 104. The processing device 102 also executes (604) a forward PDNP operation on signal samples 106. In some implementations, a forward PDNP component 312 (FIG. 3) can execute the forward PDNP operation.

Based on execution of the forward PDNP operation, the processing device 102 obtains (606) a first sequence of detected data bits 108. The processing device 102 also executes (608) a backward PDNP operation on signal samples 106. Based on execution of the backward PDNP operation on signal samples 106, the processing device 102 obtains (606) a second sequence of detected data bits 109. The processing device 102 compares (612) the first sequence of detected data bits 108 to the second sequence of detected data bits 109. Based on the comparison, the processing device 102 identifies (614) erasures in signal samples 106. For example, the processing device 102 identifies erasures by locating data bits with different bit values for the same locations of the first sequence of detected data bits 108 and the second sequence of detected data bits 109.

In this example, the processing device 102 (616) generates a corrective sequence of data bits 110 based on the identified erasures. In this example, the processing device 102 generates the corrective sequence of data bits 110, e.g., by inserting data bits into portions of signal samples 106 that include the erasures.

Figure 7:
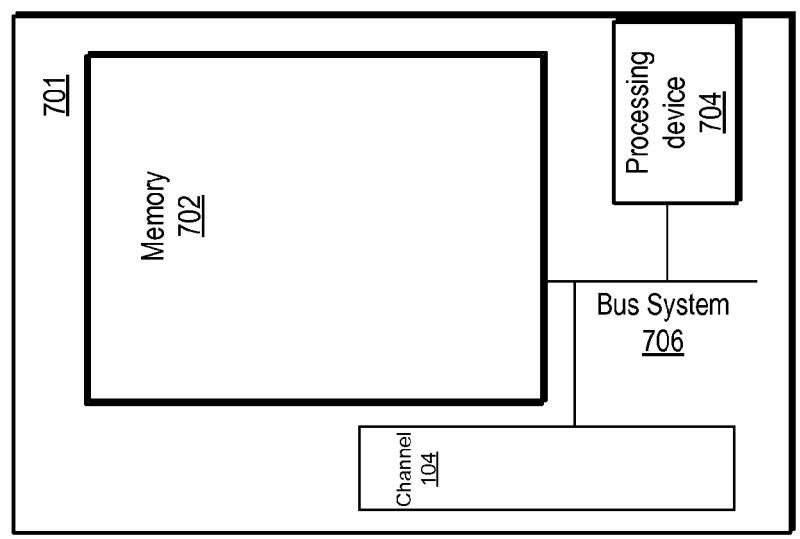

FIG. 7 illustrates an example of a disk drive 700 including a circuit board 701, a memory 702, and a bus system 706 which connects a channel 104 and a processing device 704. The memory 702 can provide instructions to the channel 104 to measure data bits from a storage device 103. The memory 700 can provide instructions to the processing device to process read signals received from the channel 104 through the bus system 706. A bus system 706, including, for example, a data bus and a motherboard, can be used to establish and to control data communication between the components in disk drive 700.

Processing device 704 can include one or more microprocessors. Generally, processing device 704 can include an appropriate processor and/or logic that is capable of receiving and storing data, and of communicating over a network (not shown). Examples of a network include a wide area network ("WAN"), e.g., the Internet. Memory 702 can include a hard drive and a random access memory storage device, including, e.g., a dynamic random access memory, or other types of non-transitory machine-readable storage devices. As shown in FIG. 7, memory 702 stores computer programs that are executable by processing device 704.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output.

The techniques described herein can be implemented advantageously in one or more computer programs that are executable on a programmable system including at least one programmable processor coupled to receive data and instructions from, and to transmit data and instructions to, a storage device system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Computer readable storage media are storage devices suitable for tangibly embodying computer program instructions and data include all forms of volatile memory such as RAM and non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

In another example, due to the nature of software, functions described above can be implemented using software, hardware, firmware, hardwiring, or combinations of any of these. Features implementing functions may also be physically located at various positions, including being distributed such that portions of functions are implemented at different physical locations.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by a disk drive, comprising:
   receiving a plurality of signal samples over a channel in the disk drive;
   executing a forward pattern-dependent noise prediction (PDNP) operation on the plurality of the signal samples, with the forward PDNP operation comprising a PDNP operation with forward linear prediction;
   generating, based on execution of the forward PDNP operation, a first detection of recorded data bits in the plurality of received signal samples;
   executing a backward PDNP operation on the plurality of the received signal samples, with the backward PDNP operation comprising a PDNP operation with backward linear prediction;
   generating, based on execution of the backward PDNP operation, a second detection of recorded data bits in the plurality of received signal samples;
   comparing the first detection to the second detection;
   identifying, based on comparing, one or more erasures in the received plurality of signal samples; and
   generating one or more sequences of bits that promote correction of the one or more erasures.

2. The method of claim 1, wherein generating, based on execution of the forward PDNP operation, the first detection comprises:
   detecting, based on execution of the forward PDNP operation, a first sequence of bits that are obtained using forward linear prediction on noise samples in the plurality of signal samples received from the channel in the disk drive;
   wherein generating, based on execution of the backward PDNP operation, the second detection comprises:
   detecting, based on execution of the backward PDNP operation, a second sequence of bits that are obtained using backward linear prediction on the noise samples in the plurality of signal samples received from the channel in the disk drive;
   wherein comparing the first detection to the second detection comprises:
      comparing the first sequence of detected bits to the second sequence of detected bits;
   wherein identifying, based on comparing the first detection to the second detection, the one or more erasures in the received plurality of signal samples comprises:

identifying, based on comparing the first sequence of detected bits to the second sequence of detected bits, a mismatch between at least a bit in the first sequence and a bit in the second sequence, with the mismatch being indicative of an error pattern in the received plurality of signal samples; and wherein generating the one or more sequences of bits that promote correction of the one or more erasures comprises:

generating one or more sequences of bits that promote correction of the error pattern.

3. The method of claim 1, wherein generating the one or more sequences of bits that promote correction of the one or more erasures comprises:

generating, using a Mahalanobis distance metric, a maximum likelihood sequence for correction of the one or more erasures.

4. The method of claim 1, wherein at least a portion of the plurality of signal samples comprises jitter noise.

5. The method of claim 1, wherein the channel comprises a heat-assisted magnetic recording channel.

6. The method of claim 1, wherein generating, based on execution of the forward linear prediction operation, the first detection comprises:

generating, based on execution of the forward PDNP operation with previous noise samples from the received signal samples, the first detection.

7. The method of claim 1, wherein generating, based on execution of the backward linear prediction operation, the second detection comprises:

generating, based on execution of the backward PDNP operation with future noise samples from the received signal samples, the second detection.

8. The method of claim 1, wherein the forward PDNP operation comprises a series of instructions that are based on:

$$\hat{n}_k(a_{k-M}^{k+\Delta}) = \sum_{i=1}^{L} f_i(a_{k-M}^{k+\Delta})n_{k-i}(a_{k-i-I}^{k-i})$$

$$= \sum_{i=1}^{L} f_i(a_{k-M}^{k+\Delta})[y_{k-i} - s_{k-i}(a_{k-i-I}^{k-i})];$$

wherein $\hat{n}_k$ is the first prediction of noise samples;
wherein $y_k = s_k(a_{k-I}^{k}) + n_k(a_{k-M}^{k+\Delta})$;
wherein $s_k$ is a desired signal;
wherein $n_k$ is a noise component;
wherein $a_k$ is a transmitted data bit;
wherein $a_{k-M}^{k+\Delta}$ is a data-dependence of $n_k$ for some non-negative integers $\Delta$ and M;
wherein $f_i$ is one or more forward noise predictor coefficients;
wherein L is a length of the first prediction; and
wherein I+1 is the length of the target used in the forward PDNP operation.

9. The method of claim 1, wherein the backward PDNP operation comprises a series of instructions that are based on:

$$\hat{n}_{b,k}(a_{k-\Delta'}^{k+M'}) = \sum_{i=1}^{L} b_i(a_{k-\Delta'}^{k+M'})n_{b,k+i}(a_{k+i}^{k+i+I'})$$

$$= \sum_{i=1}^{L} b_i(a_{k-\Delta'}^{k+M'})[y_{b,k+i} - s_{b,k+i}(a_{k+i}^{k+i+I'})];$$

wherein $\hat{n}_{b,k}$ is the second prediction of noise samples;
wherein $b_i$ is a backward noise predictor coefficient;
wherein $y_{b,k} = s_{b,k}(a_{k}^{k+I'}) + n_{b,k}(a_{k-\Delta'}^{k+M'})$;
wherein $s_k$ is a desired signal;
wherein $n_k$ is a noise component;
wherein $a_k$ is a transmitted data bit;
wherein $a_{k-M}^{k+\Delta}$ is a data-dependence of $n_k$ for some non-negative integers $\Delta$ and M;
wherein L is a length of the second prediction; and
wherein I+1 is the length of the target used in the backward PDNP operation.

10. The method of claim 1, further comprising:
correcting the one or more erasures in the received plurality of signal samples.

11. The method of claim 10, wherein correcting comprises:
inserting the generated one or more sequences into one or more locations of the one or more erasures in the received plurality of signal samples.

12. One or more machine-readable hardware storage devices storing instructions that are executable by one or more processors to perform operations comprising:

receiving a plurality of signal samples over a channel in a disk drive;

executing a forward pattern-dependent noise prediction (PDNP) operation on the plurality of the signal samples, with the forward PDNP operation comprising a PDNP operation with forward linear prediction;

generating, based on execution of the forward PDNP operation, a first detection of recorded data bits in the plurality of received signal samples;

executing a backward PDNP operation on the plurality of the received signal samples, with the backward PDNP operation comprising a PDNP operation with backward linear prediction;

generating, based on execution of the backward PDNP operation, a second detection of recorded data bits in the plurality of received signal samples;

comparing the first detection to the second detection;

identifying, based on comparing, one or more erasures in the received plurality of signal samples; and generating one or more sequences of bits that promote correction of the one or more erasures.

13. The one or more machine-readable hardware storage devices of claim 12, wherein generating, based on execution of the forward PDNP operation, the first detection comprises:

detecting, based on execution of the forward PDNP operation, a first sequence of bits that are obtained using forward linear prediction on noise samples in the plurality of signal samples received from the channel in the disk drive;

wherein generating, based on execution of the backward PDNP operation, the second detection comprises:

detecting, based on execution of the backward PDNP operation, a second sequence of bits that are obtained using backward linear prediction on the noise samples in the plurality of signal samples received from the channel in the disk drive;

wherein comparing the first detection to the second detection comprises:

comparing the first sequence of detected bits to the second sequence of detected bits;

wherein identifying, based on comparing the first detection to the second detection, the one or more erasures in the received plurality of signal samples comprises:

identifying, based on comparing the first sequence of detected bits to the second sequence of detected bits, a mismatch between at least a bit in the first sequence and a bit in the second sequence, with the mismatch being indicative of an error pattern in the received plurality of signal samples; and wherein generating the one or more sequences of bits that promote correction of the one or more erasures comprises:

generating one or more sequences of bits that promote correction of the error pattern.

14. The one or more machine-readable hardware storage devices of claim 12, wherein generating the one or more sequences of bits that promote correction of the one or more erasures comprises:

generating, using a Mahalanobis distance metric, a maximum likelihood sequence for correction of the one or more erasures.

15. The one or more machine-readable hardware storage devices of claim 12, wherein at least a portion of the plurality of signal samples comprises jitter noise.

16. The one or more machine-readable hardware storage device of claim 12, wherein the channel comprises a heat-assisted magnetic recording channel.

17. The one or more machine-readable hardware storage device of claim 12, wherein generating, based on execution of the forward linear prediction operation, the first detection comprises:

generating, based on execution of the forward PDNP operation with previous noise samples from the received signal samples, the first detection.

18. The one or more machine-readable hardware storage device of claim 12, wherein generating, based on execution of the backward linear prediction operation, the second detection comprises:

generating, based on execution of the backward PDNP operation with future noise samples from the received signal samples, the second detection.

19. An electronic system comprising:
one or more processors; and
one or more machine-readable hardware storage devices storing instructions that are executable by the one or more processors to perform operations comprising:
receiving a plurality of signal samples over a channel in a disk drive;
executing a forward pattern-dependent noise prediction (PDNP) operation on the plurality of the signal samples, with the forward PDNP operation comprising a PDNP operation with forward linear prediction;
generating, based on execution of the forward PDNP operation, a first detection of recorded data bits in the plurality of received signal samples;
executing a backward PDNP operation on the plurality of the received signal samples, with the backward PDNP operation comprising a PDNP operation with backward linear prediction;
generating, based on execution of the backward PDNP operation, a second detection of recorded data bits in the plurality of received signal samples;
comparing the first detection to the second detection;
identifying, based on comparing, one or more erasures in the received plurality of signal samples; and
generating one or more sequences of bits that promote correction of the one or more erasures.

20. The electronic system of claim 19, wherein generating, based on execution of the forward PDNP operation, the first detection comprises:

detecting, based on execution of the forward PDNP operation, a first sequence of bits that are obtained using forward linear prediction on noise samples in the plurality of signal samples received from the channel in the disk drive;

wherein generating, based on execution of the backward PDNP operation, the second detection comprises:

detecting, based on execution of the backward PDNP operation, a second sequence of bits that are obtained using backward linear prediction on the noise samples in the plurality of signal samples received from the channel in the disk drive;

wherein comparing the first detection to the second detection comprises:

comparing the first sequence of detected bits to the second sequence of detected bits;

wherein identifying, based on comparing the first detection to the second detection, the one or more erasures in the received plurality of signal samples comprises:

identifying, based on comparing the first sequence of detected bits to the second sequence of detected bits, a mismatch between at least a bit in the first sequence and a bit in the second sequence, with the mismatch being indicative of an error pattern in the received plurality of signal samples; and wherein generating the one or more sequences of bits that promote correction of the one or more erasures comprises:

generating one or more sequences of bits that promote correction of the error pattern.

* * * * *

UNITED STATES PATENT AND TRADEMARK OFFICE
CERTIFICATE OF CORRECTION

| | |
|---|---|
| PATENT NO. | : 8,711,661 B2 |
| APPLICATION NO. | : 13/745297 |
| DATED | : April 29, 2014 |
| INVENTOR(S) | : Yibin Ng et al. |

It is certified that error appears in the above-identified patent and that said Letters Patent is hereby corrected as shown below:

In the Claims

Col. 15, line 20, claim 16, delete "device" and insert -- devices --

Col. 15, line 23, claim 17, delete "device" and insert -- devices --

Col. 15, line 30, claim 18, delete "device" and insert -- devices --

Signed and Sealed this
Twelfth Day of August, 2014

Michelle K. Lee
*Deputy Director of the United States Patent and Trademark Office*